May 26, 1964   F. W. R. STARP   3,134,311
PHOTOGRAPHIC CAMERA
Filed June 11, 1962
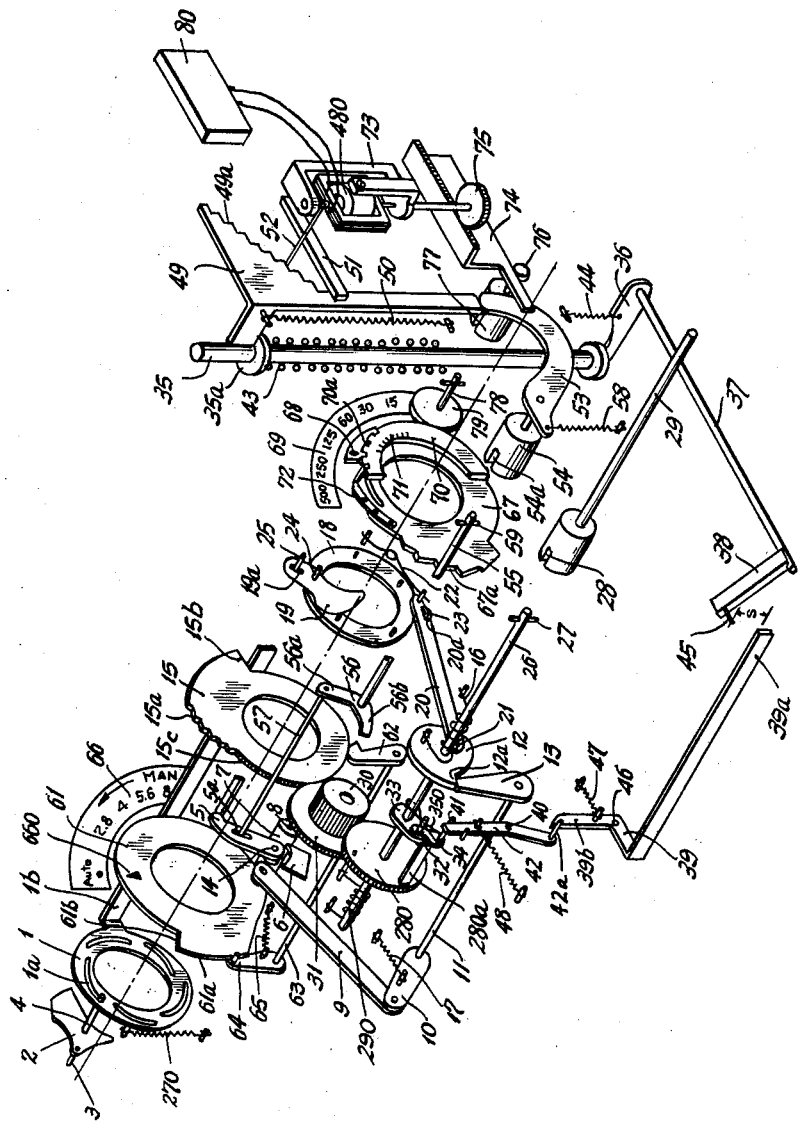
INVENTOR.
Franz W. R. Starp
BY
Arthur A. March
ATTORNEY

United States Patent Office 3,134,311
Patented May 26, 1964

3,134,311
PHOTOGRAPHIC CAMERA
Franz W. R. Starp, Calmbach (Enz), Germany, assignor to Alfred Gauthier, G.m.b.H., Calmbach (Enz), Germany, a corporation of Germany
Filed June 11, 1962, Ser. No. 201,622
Claims priority, application Germany June 13, 1961
4 Claims. (Cl. 95—10)

This invention relates to a photographic camera and more particularly to a photographic camera provided with adjustable means for determining the exposure setting.

Heretofore, cameras of this type, including those provided with spring diaphragms as well as those provided with an automatic exposure setting in response to the existing light conditions, necessarily were provided with involved complex and space-consuming mechanisms. This resulted from the requirement that the setting member obtain the appropriate setting position prior to the opening of the camera shutter whereby it was necessary to provide an adjustment of the setting motion of the setting member and the release of the camera shutter. To accomplish this result, use has been made of delayed action mechanisms by which the opening of the shutter is retarded for a period after the actuation of the release member. The time has been determined in such manner that the setting member moves through its entire traveling distance. Such delayed action mechanisms require a comparatively large space which is unavailable in certain instances, and, where available, makes the resultant camera expensive to construct. Further, when the motion of the setting member is impeded, the camera shutter released before the setting member had reached its appropriate position.

The present invention provides a solution to the problems heretofore encountered, in that means are provided for synchronizing the setting motion of the exposure setting member and the actuation of the camera shutter in a completely dependable and positive manner which means absorb only a minimum space.

A feature of the present invention is the provision of means of a positive and relatively inexpensive nature in compact form for obtaining both an automatic exposure setting in response to existent light conditions and for automatically actuating the shutter.

Still another feature of the present invention is that the camera shutter may be released only when the exposure setting member has reached the appropriate setting position.

The construction and disposition of the respective means in accomplishing the solution of the foregoing problem and the features of this invention ensures a dependability of operation and function in an uncomplicated space saving and mechanism saving manner. There is no requirement for any special structure for synchronization purposes. The absence of any impact in the inter-functioning parts of the camera provides for longevity. It is also possible, according to the development of the structure of the present invention, to utilize the uncomplicated and space saving mechanism by means of a simple adjustment to accomplish both a manually determinable exposure setting as well as the automatic setting responsive to the existent light conditions.

The feature and advantages of the present invention are described in additional detail in connection with the accompanying description and drawing.

The drawing shows the following structure which illustrates one example of the present invention:

A setting ring 1 is provided with control slots 1a and a laterally extended arm 1b. A diaphragm 2 (only one lamellae of which is shown) is rotatably mounted about a pin 3 extending from one side thereof. Fixed pins 4 extend from the other side of the diaphragm and establish a connection between the diaphragm 2 and the control ring by reason of their accommodation within the control slots 1a.

An adjustable limit lever 5, provided with a slot 5a, is operatively connected, in the manner hereinafter set forth, to the setting ring 1. A fixed stop 6 is disposed below the limit lever 5. As shown in the drawing, the limit lever 5 is mounted upon carrier 7 which is positioned about axis 8 on a fixed member of the camera or camera shutter. A driving arm 9 interconnects the carrier 7 and linkage member 10. A connecting rod 11 is secured to the linkage member 10 and an arresting lever 13. The arresting lever 13 is adapted to engage a driving disc 12 by contact with eccentric 12a. The foregoing arrangement normally maintains the driving disc 12 in the cocked position shown in the drawing. When the disc 12 is in this cocked position, the adjustable limit lever 5, disposed about axis 14, is not engaged by the fixed stop member 6.

A control ring 15, provided with a stepped cam 15a, an eccentric stop 15b and a serrated segment 15c, is coaxially operatively connected to the setting ring 1 by means of the engagement of stop 15b with lateral arm 1b.

According to the present invention, the release of the main driving disc 12 to actuate the shutter blade driving means is accomplished at the conclusion of the setting movement of ring 1. At that time one of the steps of cam 15a strikes the adjustable limit lever 5 causing movement of the carrier lever 7. This motion is transmitted to the driving arm 9 and linkage member 10. The movement of the linkage member 10, against the action of spring 17 is further transmitted to the connecting rod 11 and arresting lever 13. The travel of the arresting lever 13 causes its disengagement from the eccentric 12a of driving disc 12. This disengagement releases disc 12 for counterclockwise movement under the influence of driving spring 16, to thereby actuate the shutter blade driving means hereinafter described.

The shutter blade driving means are constructed in a well-known manner and comprise a driving ring 18 carrying shutter blades 19 which are provided with slots 19a. Only one of the shutter blades is shown in the drawing to enable a clear understanding of the entire operation. A driving pawl 20 is interposed between the driving disc 12 and the shutter blade driving ring 18. One end of the pawl 20 operatively engages the driving disc 12 about axis 21. The other end of the pawl is reciprocally connected, in known manner, to the shutter blade driving ring 18 by means of jaws 20a engaging a pin 23 on the shutter blade driving ring under the influence of a spring 22.

Pins 24 in the driving ring 18 carry the shutter blades 19 and fixed guiding pins 25 are accommodated by the slots 19a in the shutter blades.

With this construction, when the driving disc 12 is released, it moves in a counterclockwise direction consequently causing the shutter blades to move to open and closed position by means of transmitted motion imparted to the driving pawl 20, the ring 18 and the further action of the spring 22.

The main driving disc 12 is mounted on a rotatable shaft 26. A pin 27, located at one extremity of the rotatable shaft, is accommodated within a slot 28 provided in the enlarged end of a driving shaft 29. The other end of the driving shaft 29 is connected in a well-known manner with the film transport device (not shown) of the camera. To return the disc 12 to its cocked position it is only necessary to rotate the driving shaft 29. This motion is imparted, via the pin and slot coupling 27, 28, to the rotatable shaft 26 and thence to the disc 12. Thereupon, the eccentric 12a is again brought into engagement with the lever 13 and the disc 12 re-assumes the cocked position.

It is to be noted that the control slots 1a in ring 1 are so constructed that when the diaphragm setting ring 1 moves in a counterclockwise direction under the influence of spring 270, the light-transmission is successively reduced by the movement of the diaphragm lamellae 2 controlled by the setting ring 1. In accordance with the present invention, the adjustable limit lever 5, the control ring 15 and the driving means for the control ring hereinafter described, co-act in a uniquely compact and simplified manner to determine the setting position of the diaphragm setting ring 1. Further, the cooperative connection between, and the locations of, the control ring 15 and setting ring 1 effecitvely accomplish a highly desirable flexibility and selectivity in cameras utilizing the present invention. For example, in those cameras which are provided with an interchangeable lens, the control ring may be located on the shutter side while the setting ring may be arranged, in a well-known manner, on the interchangeable lens.

The driving means for the control ring 15 consist of a minimum number of elements. The driving means illustrated comprise a pinion 30, adjoining a gear 31. The gear 31 engages the serrated segment 15c of the control ring. The pinion 30 is in contact with a gear 280 disposed about the rotatable shaft 26. An arm 280a extends from the gear 280 and is operatively engaged by a pawl 32 disposed about axis 34 on one end of the lever 33. The lever 33 is carried by shaft 26 and, as shown in the drawing, is located between the gear 280 and the driving disc 12. When the shutter is cocked, the movement of the pawl 32 is transmitted, through gear 280, pinion 30, gear 31 and control ring 15, to the setting ring 1. The setting ring is thereby urged into starting position in which the diaphragm is set at the largest aperture. Until release is effected, the driving device hereinbefore described, is maintained in starting position by the engagement of the arresting lever 13 and driving disc 12. The consequent inability of the shaft to move prevents any movement of the pawl 32. The engagement of the pawl with arm 280a on gear 280 retains this gear in position against the action of spring 290 to also prevent any motion of the control ring 15 and setting ring 1.

To release the described driving mechanism provision is made of a release pin 35 having a collar or flange 35a. The base of the release pin 35 is in contact with one end of a lever 36. A connecting rod 37 is operatively secured to lever 36 and a flat plate 38 which, in turn, is adapted to contact a bent lever 39. The bent lever is provided with arms 39a and 39b. Arm 39a is acted upon by the the flat plate 38 while arm 39b is operatively associated with a release lever 42. The release lever 42 is pivotable about axis 40 and one end thereof engages a pin 41, extending from pawl 32. A pin 42a extending from the other end of the release lever 42 engages upright arm 39b of the lever 39.

The operation of the release of the driving mechanism is accomplished as follows:

The release pin 35 is depressed causing it to move, against the action of its retaining spring 43, whereupon the lever 36 is moved in a counterclockwise direction against the action of spring 44. This movement is transmitted, via the connecting rod 37, to the flat plate 38 and pin 45 bears upon arm 39a of bent lever 39. The bent lever 39 consequently turns about its axis 46, and against the action of spring 47. The movement is further transmitted to the release lever 42 by means of the pin 42a and the release lever is pivoted in a clockwise direction against the action of spring 48. The release lever 42 strikes pin 41 whereby pawl 32 is moved counterclockwise against the action of a spring 350 and is disengaged from arm 280a. Thereafter, gear 280 is rotated under the influence of driving spring 290. The movement in turn causes the rotation of pinion 30, gear 31 and control ring 15 until a stepped cam 15a on the control ring 15 is engaged by the adjustable limit lever 5. The setting ring 1, under the influence of spring 270, moves in a counterclockwise direction only to the extent of movement of the control ring 15. Therefore, according to the present invention, the size of the diaphragm aperture is determined by the position of the adjustable limit lever.

It will further be understood that when the stepped cam 15a contacts the limit lever 5, the latter moves into engagement with the fixed stop 6. This motion of the limit lever 5 causes the camera shutter to operate due to the transmission of such movement to the carrier lever 7, driving arm 9, linkage member 10, connecting rod 11 and arresting lever 13. As a consequence driving disc 12 is released and the camera shutter is opened and closed as hereinbefore described.

According to this invention the position of the adjustable limit lever 5 may be automatically set in response to existent light conditions. To accomplish this result, means are provided for automatically moving the position of the limit lever 5 in response to the movement of a rotating coil 480 of an exposure meter which is carried in turn by the action of photocell 80 and the light conditions. These means comprise a sensing member 49 provided with a stepped setting cam 49a. Under the influence of spring 50 the sensing member 49 is maintained in engagement with the collar or flange 35a on the release member 35. The spring 50, being weaker than spring 43 which urges the release member into inoperative position, has no effect upon the position of the release member.

A support bar 51 is fixedly disposed below a needle 52 which is connected to and operated by the rotating coil 480. The needle 52 is secured in a position determined by the rotating coil 480 by means of a well-known clamping device (not shown) prior to the initiation of the sensing operation. Additional means for transmitting the motion of the rotating coil 480 to position the limit lever 5 are as follows:

A U-shaped lever 53 engages the base of the sensing member 49 and is maintained in this supporting position by the influence of a spring 58. The lever 53 is also secured to a shaft 54 which in turn is coupled to a rod 55 by means of a pin 59—slot 54a connection. The rod 55 is operatively connected to a release lever 56, one arm 56a of which is affixed to one end of a driving rod 57. The other end of the driving rod is disposed in the slot 5a provided in the limit lever 5.

It will be seen that when the release member 35 is in inoperative position, as shown in the drawing, the limit lever is maintained in a position which corresponds to the smallest diaphragm aperture. This action is maintained by the balanced relation of spring 58 on lever 53 and spring 50 on sensing member 49.

The position of the stop lever 5 is automatically adjustable in response to the position of the rotating coil as follows:

When the release member 35 is depressed, the support 35a is removed from the sensing member 49. The sensing member 49, under the influence of spring 50, travels until the stepped cam 49a engages the needle 52 carried by the rotating coil 480. It will be understood that the particular step of the cam 49a which is engaged by the needle 52 is determined by the position of the needle. This position is selected by the movement of the rotating coil in response to existing light conditions initially transmitted to the photocell 80. The sensing member therefor travels only to the extent determined by the existing light conditions. The following movement of the U-shaped lever 53, shaft 55, release lever 56, connecting rod 57 and the pivoting movement of the stop lever 5 is determined by the initial movement of the sensing member. In this fashion the movement of the rotating coil ultimately automatically adjusts the position of the limit lever 5. The movement of the limit lever 5 to the adjusted position is not transmitted to the means for driving the control ring hereinbefore described due to the space "S" which exists between the flat lever 38 and the arm 39a of lever 39 whereby upon the adjusting movement of the stop lever no contact is established between the lever 39 and the lever 38. It will be understood however that the position of the limit lever 5 selects the particular step 15a of the control ring 15 which engages the limit lever to thereby determine the aperture size of the diaphragm.

In addition to the automatic setting of the diaphragm the present invention provides means enabling the diaphragm to be manually set for flashlight exposures, for example. Provision is made of a manually operable setting ring 61 having both automatic (Auto) and non-automatic (Man) positions. The ring 61 is provided with a control cam 61a and a stop 61b. When the ring is moved into the position indicated by the description "Man" a locking arrangement hereinafter described moves into operative position, viz, that position which is associated with the smallest diaphragm aperture as shown in the drawing.

The locking arrangement comprises an arresting lever 62 located intermediate the sensing member 49 and limit lever 5. The arresting lever 62 is connected by a shaft 63 to a control lever 64. The control lever 64 is normally urged into engagement with the contact cam 61a of ring 61 by a spring 65. It will be understood that when the ring 61 is disposed at the position indicated by the designation "Auto," the arresting lever 62 is maintained in the inoperative position shown in the drawing and the position of the limit lever 5 controls the diaphragm setting as hereinbefore described.

When the ring 61 is moved into the position indicated by the designation "Man," the control lever 64 is disengaged from the control cam portion 61a of the ring 61 and moves in a clockwise direction under the influence of spring 65. This motion is transmitted through the connecting rod 63 to the arresting lever 62. The arresting lever thereupon moves in a clockwise direction into the path of motion of the arm 56b of release lever 56. The release lever is thereby maintained against movement when the release member 35 is depressed. Consequently, the limit lever 5 is prevented from moving due to its connection with the release lever 56 by means of the driving rod 57. With this arrangement, the control ring 15 may move until the stepped cam 15a engages the limit lever 5, which is arrested by the lever 56 in a position corresponding to the smallest diaphragm aperture. The extent of movement of the diaphragm setting ring 1 is therefore not automatically determined but instead is determined by the manual setting of the ring 61.

The manual setting of the diaphragm is effected by means of the stop 61b on the ring 61. When the ring is set in the "Man" setting the stop is positioned in the path of travel of the laterally extended arm 1b carried by the diaphragm setting ring 1. Upon movement of the diaphragm setting ring under the action of spring 270, the arm 1b encounters the stop 61b at a predetermined position. The predetermined position is obtained by the setting of the fixed diaphragm scale 66 in relation to the indicating mark 660 arranged on ring 61. The desired diaphragm aperture is thereby manually accomplished.

In accordance with the present invention it is also possible to provide a setting for different exposure times. For this purpose the camera shutter comprises an exposure time setting ring 67 provided with a control cam 67a which operates in a well-known manner to set an exposure time escapement mechanism (not shown). The appropriate setting may be obtained by disposing the mark 68 arranged on ring 67 opposite the desired indicia provided on the fixed exposure time scale 69.

In order to provide the appropriate setting for the sensitivity of the film used in the camera, another ring member 70 is coaxially arranged with the exposure time setting ring 67 and is provided with a film sensitivity scale 71. The appropriate indicia on the film sensitivity scale may be located opposite the mark 68 disposed on ring 67 by manual adjustment. The ring 70 is releasably coupled to the exposure time setting ring 67 in the manner hereinafter set forth. Further, the ring 70 may be set in different positions with respect to the exposure time setting ring 67 and these positions are indicated by the indicia on the scale 71.

For releasably coupling the ring 70 and the exposure time setting ring 67, the ring 70 is provided with notches 70a which accommodate a spring blade 72 fixed to the exposure time setting ring 67. In order to adjust for the appropriate film sensitivity it is only necessary to disengage the spring blade 72 from the notch 70a and thereafter to move the ring 70 to a position in which the appropriate value on the scale 71 is located opposite the mark 68.

In the automatic setting of the diaphragm, the settings for exposure time and film sensitivity take place in a well-known manner. For this purpose the carrier 73 of the coil 480 is rotated in response to the adjusting motion of the exposure time setting ring 67 and the ring 70. By this action the position of the rotating coil is changed. The operative connection between the rings 67 and 70 and the carrier 73 comprise a rack gear 74 which is engaged on one side by a gear 75 fixed to the carrier 73. The other side of the rack gear is engaged by a pinion 76 which is operatively secured to a shaft 77. The shaft 77, through a pin and slot coupling arrangement, is connected to a rod 78 carried by a gear 79. The gear 79 engages the ring 70 and moves in response to the movement of rings 67 and 70 to ultimately effect the rotation of the carrier 73.

While the invention has been described in detail in connection with one illustrative embodiment thereof, it will be understood that variations and modifications may be made without departing from the spirit of the invention or the scope of the appended claims.

I claim:

1. A photographic camera provided with a shutter and an exposure setting member, means for actuating the shutter, means for automatically determining the exposure setting in response to the existing light conditions, said means comprising an adjustable member operatively connected to the shutter actuating means, and means operatively connected with the said adjustable member to set the exposure at a manually adjustable predetermined position and rendering inoperative the means for automatically determining the exposure setting.

2. A photographic camera comprising an exposure setting member, an adjustable stop means operatively associated with said exposure setting member for determining the setting position thereof, said adjustable stop means including a movable carrier and an adjustable stop carried on said carrier, a shutter mechanism including a shutter drive means, an arresting lever for arresting said shutter drive means in the cocked position thereof, linkage means operatively connecting said movable carrier to said arresting lever, a counterstop operatively associated with said setting member arranged to impinge on said adjustable stop whereby upon the impingement of said counterstop on said adjustable stop, said stop is moved from a starting position associated with the non-influenced state of the stop to an operative position, a fixed stop for limiting the movement of said adjustable stop in the operative position thereof whereupon the linkage means operatively connected to the arresting lever of the shutter mechanism is operated to release said shutter mechanism.

3. The invention as defined in claim 2 wherein said counterstop is arranged in a control member coaxially disposed with respect to said exposure setting member, and spring means operating on said setting member for normally biasing the same into following relationship with respect to said control member.

4. The invention as defined in claim 3 and including an exposure meter for automatic operation operatively associated with said stop lever to position the same in accordance with the light intensity sensed by said meter, selector means operatively associated with said stop lever for selecting either automatic or non-automatic operation thereof so that in the non-automatic position of said selector means the adjustable stop is moved to a position corresponding to the greatest path of travel of said control member, and said selector having a stop connected thereto which can be guided into operative position.

References Cited in the file of this patent

UNITED STATES PATENTS

| | | |
|---|---|---|
| 2,923,216 | Greger | Feb. 2, 1960 |
| 2,949,070 | Frost | Aug. 16, 1960 |
| 3,041,950 | Werrmann | July 3, 1962 |